June 11, 1929.   P. SIEGERT   1,716,800
DEVICE FOR INSPECTING OVENS
Filed May 28, 1928
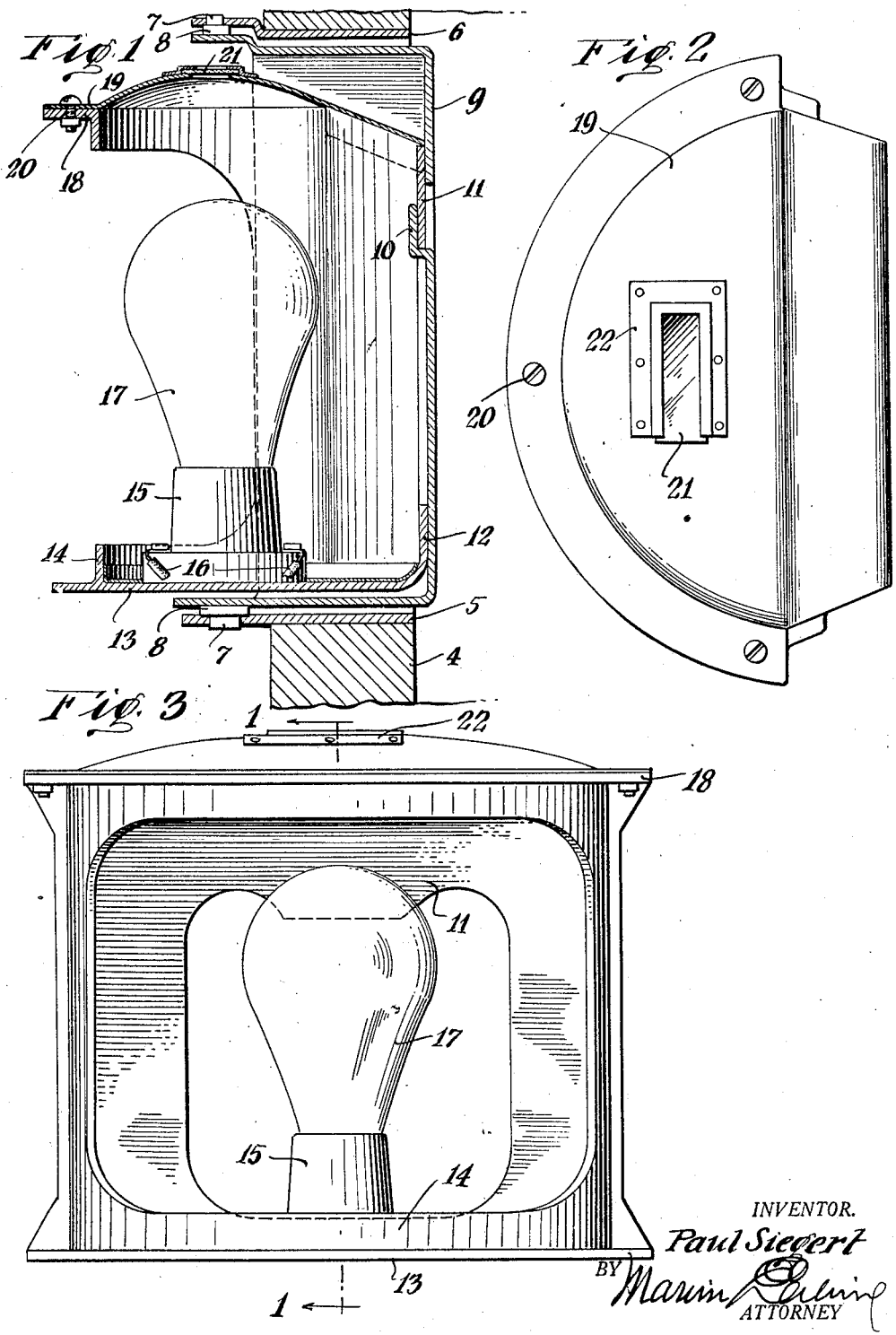
INVENTOR.
Paul Siegert
BY
ATTORNEY Patented June 11, 1929.

1,716,800

UNITED STATES PATENT OFFICE.

PAUL SIEGERT, OF YONKERS, NEW YORK.

DEVICE FOR INSPECTING OVENS.

Application filed May 28, 1928. Serial No. 280,984.

This invention relates to ovens and more particularly to devices for enabling the inspection of the contents of an oven during the process of baking.

In baking and cooking certain foods in ovens it is necessary from time to time to inspect the food to ascertain the manner in which the cooking is progressing. Heretofore, it has been necessary to open the door of the oven; but this causes a sudden change in temperature in the oven and often is disastrous to the proper cooking of the contents of the oven, especially in the baking of breads, cakes, and the like.

It is therefore an object of this invention to provide a device by which the interior of an oven may be illuminated to enable the contents of the oven to be conveniently inspected without causing sudden changes in temperature.

It is a further object of the invention to provide an illuminating device for ovens which is durable and which occupies a negligible space.

These and other objects are attained by the novel construction, combination and arrangement of parts, hereinafter described and shown in the accompanying drawing, constituting a material part of this disclosure and in which:—

Figure 1 is a cross-sectional side view of the illuminating device.

Figure 2 is a plan view of the device.

Figure 3 is an elevational view of the device.

Referring to the drawings, a wall 4 of an oven is provided with a rectangular aperture, and supporting plates 5 and 6 are secured to the wall at the lower and upper edges of the aperture. A frame 9 is pivotally supported in the plates 5 and 6 by means of pins 7, the latter having enlarged portions 8 to properly space the frame from the plates.

A portion of the rear wall of the frame is cut and bent inwardly to form a hook 10 which is adapted to be engaged by a portion 11 of the rear wall of a casing 12, the latter having a base 13 and an upstanding flange 14. Mounted on the base 13 is a socket 15, in which is inserted an incandescent lamp 17 receiving current through the lead wires 16, which are connected to a source of electrical current, not shown.

The side walls of the casing have flanged portions 18 at their upper edges and a cover 19 is attached to the flanges by means of screws 20.

The cover 19 is apertured and the aperture is surrounded by a flanged plate 22 which forms with the cover 19 grooves in which a sheet of mica may be inserted. The aperture in the cover 19 enables the inspection of the lamp 17 from above to ascertain the condition of the lamp.

In operation, when it is desired to inspect the interior of an oven and the contents thereof, the casing 12 is rotated about the pins 7 so that the lamp 17 will be positioned inside of the oven. The oven will then be illuminated and the contents may be readily inspected through a convenient window (not shown) provided in a wall of the oven. It will be seen that the interior may be readily inspected without causing a lowering of the temperature of the oven and without danger of breaking any of the parts of the device on account of high temperatures.

The foregoing disclosure is to be regarded as descriptive and illustrative only; and not as restrictive or limitative of the invention, of which an embodiment may obviously be constructed including many modifications, without departing from the general scope herein indicated and denoted in the appended claims.

Having thus described my invention, what I claim as new and desire to secure by Letters Patent, is:—

1. In combination with a wall of an oven, said wall having an aperture, a device for illuminating the interior of the oven, said device comprising a frame pivotally supported by the wall, the rear wall of the frame having a portion cut and bent to form a hook, a casing having a rear wall cut so that it may engage the hook, a socket mounted on the base of the casing, and an incandescent lamp mounted in the socket.

2. In combination with a wall of an oven said wall having an aperture, a device for illuminating the interior of the oven and positioned in the aperture, said device comprising a frame pivotally supported on the wall, the rear wall of the frame having a portion cut and bent to form a hook, a casing having a rear wall cut so that it my engage the hook, a socket mounted on the base of the casing, an incandescent lamp mounted in the socket, and a cover for the casing having an aperture through which the lamp may be inspected.

In witness whereof I have affixed my signature.

PAUL SIEGERT.